US012656480B2

(12) United States Patent (10) Patent No.: US 12,656,480 B2

Emadi et al. (45) Date of Patent: Jun. 16, 2026

(54) SYSTEM AND METHOD FOR HIGH RESOLUTION BEAMFORMING FOR COHERENT TARGETS

(71) Applicant: Zadar Labs, Inc., Santa Clara, CA (US)

(72) Inventors: Mohammad Emadi, San Jose, CA (US); Shahin Khobahi, San Jose, CA (US); Ali Mostajeran, Morgan Hill, CA (US)

(73) Assignee: Zadar Labs, Inc., Campbell, CA (US)

( * ) Notice: Subject to any disclaimer, the term of this patent is extended or adjusted under 35 U.S.C. 154(b) by 407 days.

(21) Appl. No.: 18/357,755

(22) Filed: Jul. 24, 2023

(65) Prior Publication Data

US 2025/0035776 A1 Jan. 30, 2025

(51) Int. Cl.
*G01S 13/89* (2006.01)
*G01S 7/288* (2006.01)
*H04B 7/0426* (2017.01)

(52) U.S. Cl.
CPC ............ *G01S 13/89* (2013.01); *G01S 7/2883* (2021.05); *H04B 7/043* (2013.01)

(58) Field of Classification Search
CPC ........ H04B 7/04; H04B 7/043; H04B 7/0636; G01S 7/2883; G01S 7/42; G01S 13/42; G01S 13/89
USPC ........ 375/260, 262, 265, 267; 370/210, 334; 342/140, 145, 189, 196; 708/404, 405, 708/422, 514, 520
See application file for complete search history.

(56) References Cited

U.S. PATENT DOCUMENTS

| | | | | |
|---|---|---|---|---|
| 8,466,829 B1 * | 6/2013 | Volman | ..... | G01S 3/48 342/149 |
| 2005/0285788 A1 * | 12/2005 | Xin | ..... | G01S 3/46 342/432 |
| 2014/0152504 A1 * | 6/2014 | Kulaib | ..... | G01S 5/04 342/437 |
| 2017/0097409 A1 * | 4/2017 | Okamoto | ..... | G01S 13/345 |
| 2019/0212411 A1 * | 7/2019 | Kang | ..... | G01S 3/46 |
| 2021/0337357 A1 * | 10/2021 | Kassas | ..... | G01S 5/0205 |
| 2022/0021419 A1 * | 1/2022 | Zaidi | ..... | G01S 13/4454 |

* cited by examiner

*Primary Examiner* — Young T. Tse

(74) *Attorney, Agent, or Firm* — UTULAW PC

(57) ABSTRACT

A system and method to receive correlated input signals from targets from antennas in a linear or planar antenna array, receive coarse estimations of azimuth and/or elevation angles for the targets, apply a semi-randomized signal permutation and reference selection algorithm to the correlated input signals to construct a virtual array information matrix (VAIM) by shifting a reference point of each of the correlated input signals in a different manner from one another to separate the correlated input signals from one another in a signal space in the VAIM, and filter the VAIM to independently extract information of the coarse estimations from the VAIM for each specific azimuth angle or elevation angle to transform the VAIM to provide filtered output signals corresponding, respectively, to filtered versions of each of the coarse estimations of the at least one of azimuth angles and elevation angles for each of the targets.

16 Claims, 5 Drawing Sheets

410 — Receive Input Signals from Targets via Antenna Array

420 — Receive Coarse Estimations of Azimuth and/or Elevation Angles for each of the Targets 430 — Apply a Semi-randomized Signal Permutation and Reference Selection Algorithm to Input Signals to Construct a Virtual Array Information Matrix (VAIM)

440 — Filter the VAIM to Provide a Plurality of Filtered Output Signals Corresponding to Filtered Versions of the Coarse Estimates 450 — Use the Filtered Output Signals to Refine the Coarse Estimates to Provide Refined High-Resolution Output Signals

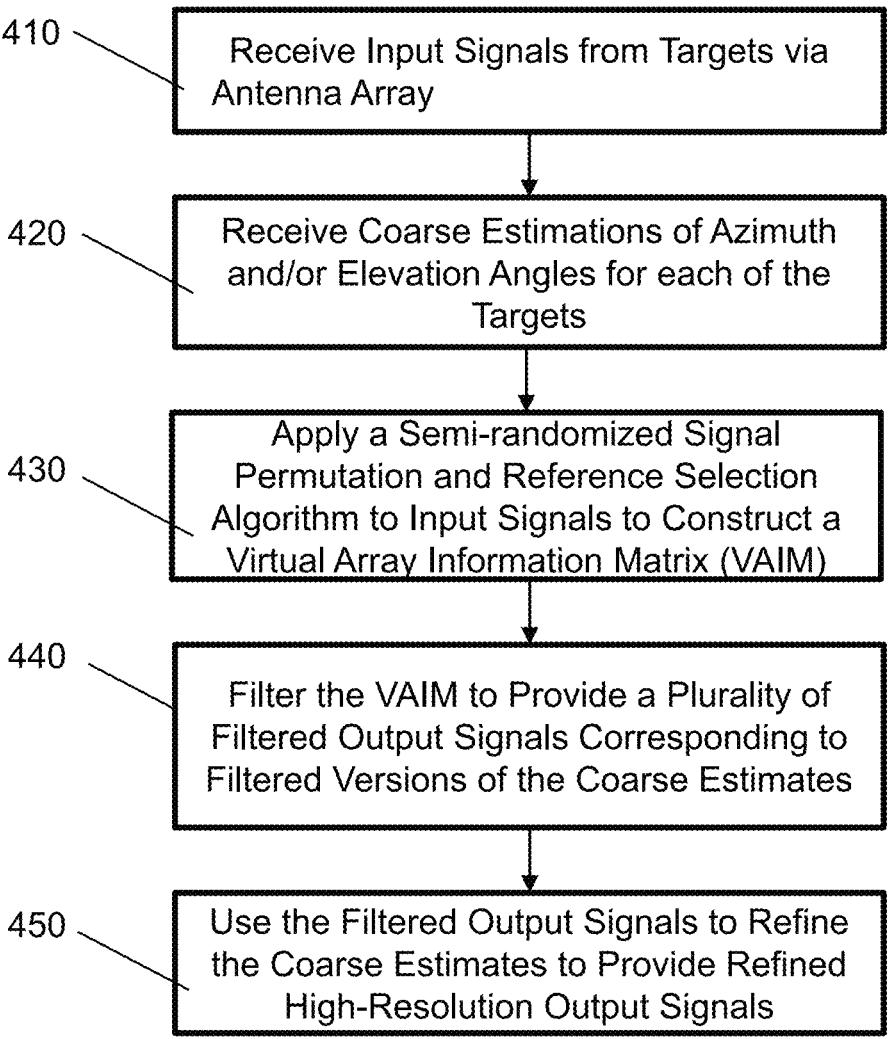

410 — Receive Input Signals from Targets via Antenna Array

420 — Receive Coarse Estimations of Azimuth and/or Elevation Angles for each of the Targets 430 — Apply a Semi-randomized Signal Permutation and Reference Selection Algorithm to Input Signals to Construct a Virtual Array Information Matrix (VAIM)

440 — Filter the VAIM to Provide a Plurality of Filtered Output Signals Corresponding to Filtered Versions of the Coarse Estimates 450 — Use the Filtered Output Signals to Refine the Coarse Estimates to Provide Refined High-Resolution Output Signals

FIG. 4

SYSTEM AND METHOD FOR HIGH RESOLUTION BEAMFORMING FOR COHERENT TARGETS

BACKGROUND

There exists an ever-growing demand for achieving high angular resolution of radars (which is often referred to as high resolution beamforming), and specifically, achieving competing and even superior angular resolution in a spatial domain through a radar system as compared to more costly sensor counterparts, such as Light Detection and Ranging (LI-DAR) sensors. Conventionally, one can resort to naive approaches in increasing the angular resolution, such as increasing the aperture size via introducing more antenna elements. However, this leads to a huge computational burden hindering in-time decisions of the autonomous agent. As an alternative, one may consider increasing the angular resolution of the system in the digital and software domain (enabled by the emerging software defined imaging radar systems), from an algorithmic development perspective.

Specifically, such digital and software methodologies rely on exploiting the mathematical and statistical structure of the signal to achieve so-called super resolution. However, there exist several drawbacks in employing such methodologies for increasing the resolution, as discussed below. Further, many of these methodologies rely on highly computationally expensive mathematical operations to distinguish the targets. Specifically, a costly matrix decomposition (e.g., singular/eigenvalue decomposition) is usually required as part of the processing stages of these methodologies. This requires extremely complicated hardware design, memory consumption, and large processing time. Thus, it can be seen that such methods cannot provide competing performance for autonomous agents operating in an ever-changing environment.

SUMMARY

In an implementation, a method is provided including receiving a plurality of correlated input signals and non-correlated input signals at a processor from a plurality of targets in a scene in an environment from antennas in a linear antenna array or a planar antenna array, receiving coarse estimations at the processor of at least one of azimuth angles and elevation angles for each of the targets, applying the correlated input signals to the processor which is configured to apply a semi-randomized signal permutation and reference selection algorithm to the correlated input signals to construct a virtual array information matrix (VAIM) by shifting a reference point of each of the correlated input signals in a different manner from one another to separate the correlated input signals from one another in a signal space in the VAIM, and filtering the VAIM by receiving, at the processor, the coarse estimations of the at least one of azimuth angles and elevation angles for each of the targets and independently extracting information of the coarse estimations from the VAIM for each specific azimuth angle or elevation angle of the received correlated input signals to transform the VAIM to provide a plurality of filtered output signals corresponding, respectively, to filtered versions of each of the coarse estimations of the at least one of azimuth angles and elevation angles for each of the targets.

In another implementation, a signal processing system is provided to refine coarse estimates of angles from radar returns for high-resolution beamforming, the system including one or more processors coupled to receive signals from the radar system, and one or more machine-readable media storing instructions which, when executed by the one or more processors, cause the one or more processors to: receive a plurality of correlated input signals and non-correlated input signals at a processor from a plurality of targets in a scene in an environment from antennas in a linear antenna array or a planar antenna array of the radar system; receive coarse estimations at the processor of at least one of azimuth angles and elevation angles for each of the targets; apply the correlated input signals to a semi-randomized signal permutation and reference selection (SSPR) module in the processor to apply a semi-randomized signal permutation and reference selection algorithm to the correlated input signals to construct a VAIM by shifting a reference point of each of the correlated input signals in a different manner from one another to separate the correlated input signals from one another in a signal space in the VAIM; and filtering the VAIM in a signal extraction and interference cancelation (SEIC) module of the processor, wherein the SEIC module is configured to receive the coarse estimations of the at least one of azimuth angles and elevation angles for each of the targets and independently extract information of the coarse estimations from the VAIM for each specific azimuth angle or elevation angle of the received correlated input signals to transform the VAIM to provide a plurality of filtered output signals corresponding, respectively, to filtered versions of each of the coarse estimations of the at least one of azimuth angles and elevation angles for each of the targets.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 4 shows a flow diagram of operations of a system for providing high-resolution beamforming for coherent targets, in accordance with aspects of the present disclosure.

DETAILED DESCRIPTION

Figure 1:
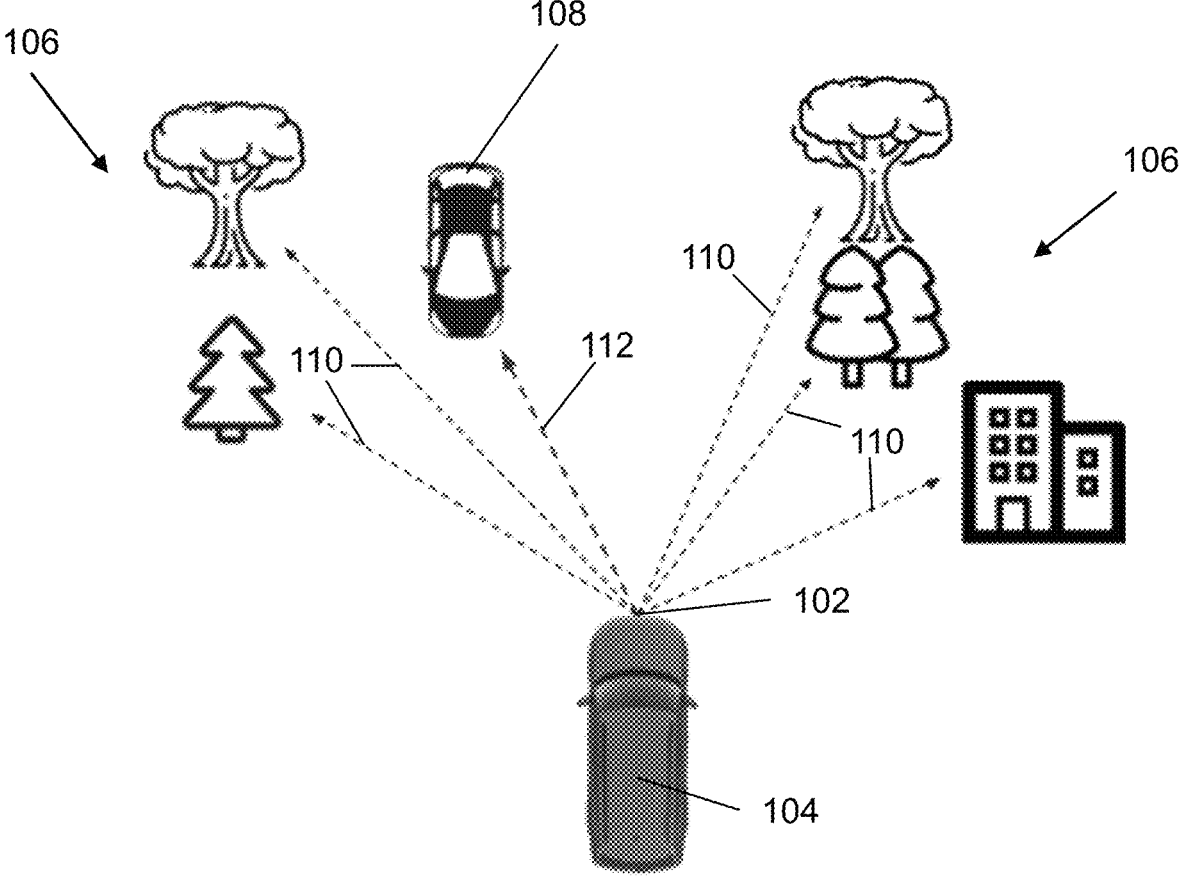
FIG. 1 illustrates an example of an environment in which the system and method of the present disclosure can be utilized.

In the following detailed description, numerous specific details are set forth by way of examples in order to provide a thorough understanding of the relevant teachings. How-ever, it should be apparent that the present teachings may be practiced without such details. In other instances, well known methods, procedures, components, and/or circuitry have been described at a relatively high-level, without detail, in order to avoid unnecessarily obscuring aspects of the present teachings.

This disclosure is directed to a novel and first-of-its-kind high resolution hybrid beamforming system and method, and, in particular, to a Direction of Arrival (DOA) estimation algorithm that achieves super resolution accuracy, while having an extremely low computational complexity. Namely, the disclosed methodology outperforms the exist-ing super-resolution (spectral and non-spectral based) meth-ods both in terms of accuracy and computational time, while allowing for parallel processing leading to amortized com-putations. This is due to the fact that the disclosed approach, unlike the existing models, can resolve both the azimuth and elevation angles of the targets, via projecting the signals into a lower-dimension space using only matrix-vector multipli-cation operations. Due to the hybrid nature of the disclosed methodology, and in contrast to the existing spectral-based method, a prior knowledge of the number of targets is not required, as the disclosed approach has a sequential DOA refinement module that can adaptively and automatically obtain such information "on-the-fly."

Also, the disclosed approach employs a low-computa-tional complexity operation for resolving correlated targets, and allows for highly accurate separation of such correlated targets in the environment. More concretely, in radar sys-tems, correlated targets refer to multiple targets that are closely located and may appear as a single target in the radar image. Correlated targets can arise due to various reasons, such as reflection from the same object or objects that are closely spaced, among many others. In such cases, it can be extremely challenging to distinguish the individual targets and accurately determine their positions, velocities, and other properties. The disclosed approach also allows for highly flexible software-defined imaging capabilities as it allows for controlling the computational complexity, accu-racy, and the capability of azimuth-only or azimuth-eleva-tion AoA (angle of arrival) detection depending on the user-defined requirements. This makes it a state-of-the-art system and method for real-time software defined radar imaging systems for complex environments in terms of accuracy, flexibility and computational time.

In particular, this disclosure describes a novel and sophis-ticated methodology for direction of arrival estimation of complex scenes, highly suitable for real-time radar imaging systems with applications to autonomous agents, such as autonomous vehicles. It also describes a novel approach for 1-D and 2-D hybrid sequential beamforming techniques. The sequential nature of the approach allows for the system to adaptively and reliably resolve a scene in terms of number of targets and the corresponding azimuth and elevation angles of each respective target in the scene, via employing low-computational complexity operations, and introducing a novel virtualization of the array. Still further, the present disclosure describes a novel and first-in-the-literature tech-nique for achieving super-resolution via exploiting the Van-dermonde structure of the signal and the corresponding virtual array information of a fast Fourier transform (FFT) method in lieu of employing highly computational opera-tions such as singular/eigenvalue decomposition techniques currently used in the industry and academia.

It is noted that the disclosed approach for azimuth esti-mation is applicable to both planar and linear arrays. Herein, the following discussion will be with regard to linear arrays, with the understanding that the system and method can be used with planar and 2-D arrays as well. A discussion of extending the discussion of linear arrays set forth below to planar and 2-D arrays will be provided following the dis-cussion with regard to using linear arrays.

Referring to FIG. 1, an example is shown of an environ-ment in which the system and method of the present dis-closure can be utilized. As shown in FIG. 1, a radar system 102 is mounted on a moving platform 104, such as a moving vehicle, which is in motion relative to a plurality of sur-rounding static objects 106 and other moving objects 108. The radar system 102 includes a transmitter (not shown) which transmits a plurality of radar signals, including sig-nals 110, which reflect off the surrounding static objects 106, and signals 112, which reflect off other moving objects 108. The radar system 102 also includes a receiver (not shown) to receive the reflected radar returns from the signals 110 and 112 and an onboard computer (see FIG. 2) for carrying out the signal processing of the radar returns in the manner discussed below with regard to FIGS. 2 and 3. Regarding this, the transmitted radar signals 110 and 112 are identical in the outbound direction but will be different in the return direction since the radar returns for the signals 110 will be reflected from static objects, whereas the radar signals 112 will be reflected from moving objects.

Figure 2:
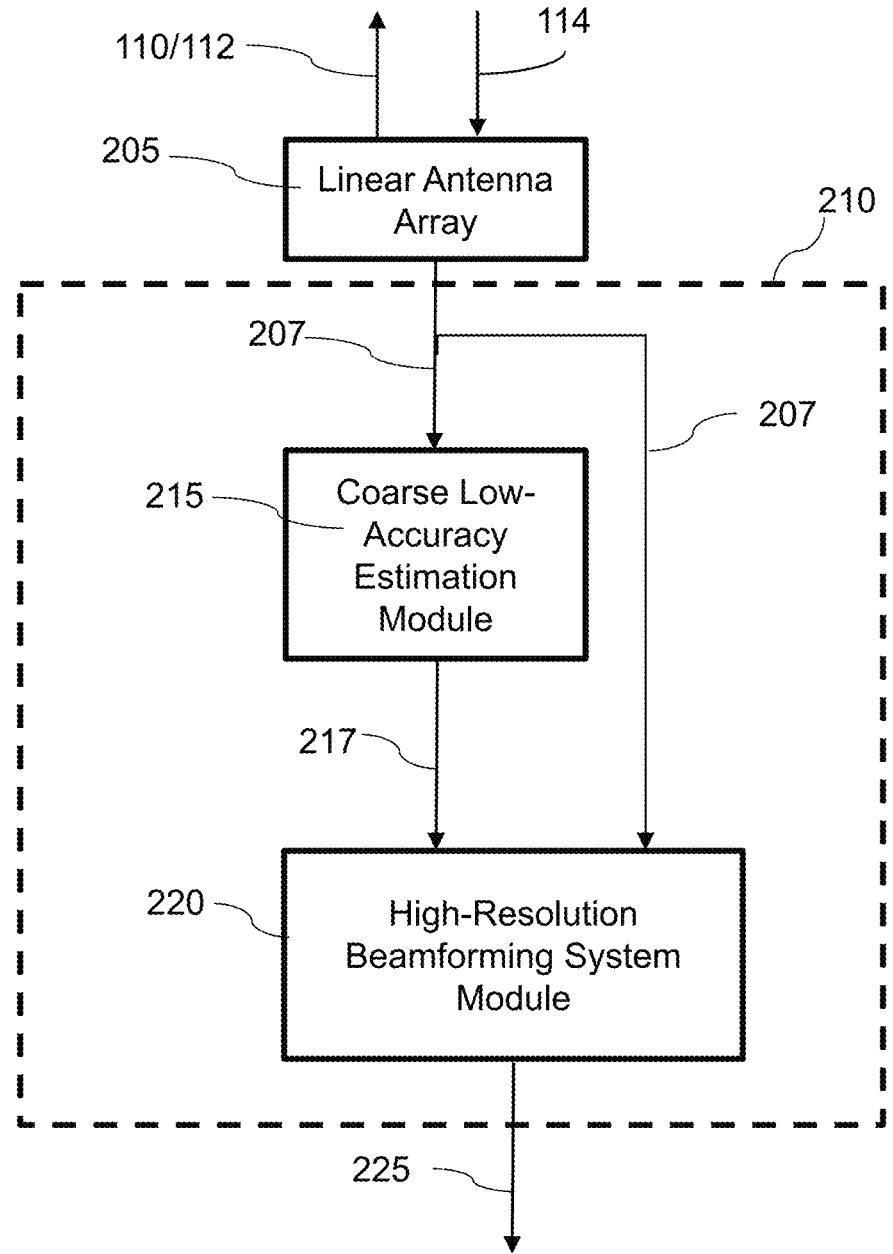
FIG. 2 illustrates an example of a radar signal transmitting/receiving linear array coupled to an onboard computer including a signal processing system in accordance with one aspect of the present disclosure.

Referring to FIG. 2, an overall system is shown for receiving the return signals 114 from targets 106 and 108 shown in FIG. 1, in response to the transmitted signals 110 and 112, and for performing signal processing on these return signals 114. In the implementation shown in FIG. 2, the signals 110/112 are transmitted and the signals 114 are received by a linear antenna array 205 (although, as noted above, and discussed further below, a planar array can be used as well). The linear array 205 provides output signals 207, which are vectors of complex-valued signals on the n antenna elements in the linear array 205 on the radar platform 104. These output signals 207 are input to different modules in an onboard computer 210 for signal processing. Specifically, the onboard computer 210 includes a coarse low-accuracy estimation module 215 and a high-resolution beamforming system module 220, which will be described in more detail in FIG. 3. The coarse low-accuracy estimation module 215 receives the output signals 207 of the linear antenna array 205 and provides coarse low-accuracy esti-mation signals 217 of the azimuth angle of the targets using conventional beamforming approaches (e.g., Fourier trans-form-based techniques), or subspace techniques (e.g., MUSIC, ESPIRIT, root-MUSIC), among many others. The high-resolution beamforming system module 220 receives both the output signals 207 from the linear antenna array 205 and the coarse low-accuracy estimation signals 217 to produce high-resolution output signals 225, as will also be discussed below with regard to FIG. 3.

Figure 3:
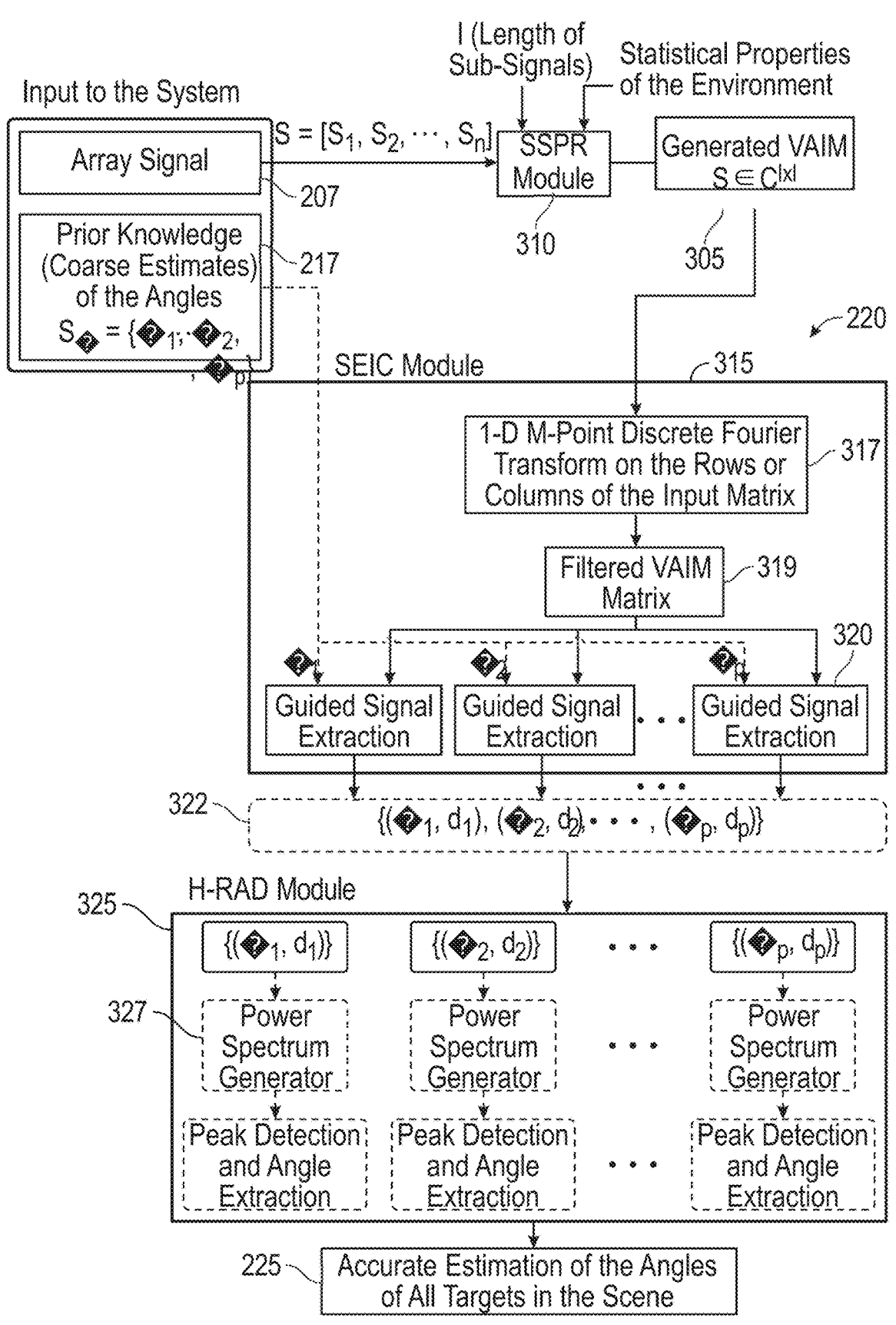
FIG. 3 is a block diagram illustrating a methodology of using modules in the signal processing system in accordance with one aspect of the present disclosure.

Referring to FIG. 3, the inputs to the high-resolution beamforming system module 220 are the received array signal 207 from the linear (or planar) array 205, as well as the coarse estimation signal 217 of the azimuth angles of targets 106 and 108 in a scene illuminated by the radar system 102 on the radar platform 104 which includes the linear array 205. As noted above with regard to FIG. 2, the coarse low-accuracy estimation signal 217 of the azimuth angle of the targets can be obtained by the coarse low-accuracy estimation module 215 using any method such as conventional beamforming approaches (e.g., Fourier trans-form-based techniques), or subspace techniques (e.g., MUSIC, ESPIRIT, root-MUSIC), among many others.

The disclosed approach begins by receiving the coarse estimation signals 217 in the high-resolution beamforming system module 220 from the coarse low-accuracy estimation module 215 of the azimuth angle contained in a set $S_\phi = \{\phi_1, \phi_2, \ldots, \phi_p\}$ of input signals 207 having p elements, each of which represents the prior coarse estimation of the azimuth angles of the targets. The disclosed approach will sequentially process and refine the available information coming from the antenna array 205 as the array signal 207 as well as the initial coarse estimate set $S_\phi$ (e.g., signal 217) to refine the initial coarse estimates and output highly accurate estimations 225 of the azimuth angles of the targets 110 and 112, as described below.

As also shown in FIG. 3, letting the array signal 207 from the linear antenna array 205 be designated as $s \in C^n$ representing the received vector of complex-valued signals 114 on the n antenna elements in the linear array 205 on the radar platform 104, the system module 220 then creates a virtual array information matrix (VAIM) 305 from the existing signal s. The VAIM 305 is constructed using the statistical and mathematical structure of the received signal as the input to a Semi-Randomized Signal Permutation and Reference Selection (SSPR) module 310. An SSPR algorithm in the SSPR module 310 receives a vector s containing the complex-valued signals 207 received on the antenna elements of the linear array 205. The SSPR algorithm also receives a user-defined hyper-parameter l and prior mathematical and statistical information of the environment, and, from all of these inputs, constructs a VAIM complex-valued matrix $S \in C^{l \times l}$ (e.g., the VAIM 305) as its output. As discussed below, this VAIM 305 will be used in the succeeding signal processing modules to extract the angles of interest.

In an environment where there exist numerous correlated signals and targets in the scene, existing beamforming approaches fail to resolve the corresponding azimuth/elevation angles of the correlated targets. Specifically, such a correlation of received signals and targets leads to disastrous effects on the subsequent signal processing modules in previous systems and a total loss of information for those since all the correlated targets appear as a single target. In other words, the existing models fail to separate such correlated signals and targets. Accordingly, the purpose of the SSPR module 310 is to process the existing information s (i.e., the array signals 207) which contains the information of correlated targets and which generates the VAIM 305. In the generated matrix VAIM 305, the information of the correlated signals/targets is now separable in the signal space, allowing for the subsequent processing modules to accurately resolve the azimuth/elevation angle of correlated and uncorrelated signals, as will be discussed below.

The SSPR methodology in the module 310 works as follows. Given the tunable user input l and the statistical structure of the impinging signals s, the algorithm in module 310 first chooses n' sub-vectors of size l of antenna elements, from the signal vector s, in a semi-randomized fashion. Specifically, each chosen sub-signal corresponds to looking at the scene from the perspective of the chosen l antenna elements which has the same effect of performing a unique shift of reference in the temporal and spatial domain. Then, these n' sub-signals of length l are combined together in a non-trivial linear manner to produce the VAIM 305.

It is noted that the SSPR algorithm in the module 310 can be modified to account for non-linear combinations of the sub-signals to further increase the information contained in the VAIM 305. Namely, such a shift in reference of the signal in the SSPR module 310 allows for separating the correlated signals later in a detection module (e.g., the Signal Extraction and Interference Cancellation (SEIC) module 315 discussed below). The SSPR process and the resulting VAIM 305 allows for the subsequent signal processing modules to be able to accurately separate correlated signals (if present) and has no effect in the case of non-correlated signals. It is noted that the resulting VAIM 305 is a (l×l) matrix, whose dimensions directly control the computational complexity of the subsequent modules, and, thus, can be controlled by a user depending on the application and the statistics of the environment. This provides giving high flexibility to the disclosed modules to be able to operate in both computationally limited and more powerful systems.

Upon deriving the complex-valued (l×l) VAIM matrix 305, the system module 220 exploits the prior knowledge of the available coarse estimation 217 of the azimuth angles of the targets to obtain a highly accurate estimation of the angles (i.e., output 225), as will be discussed below. This process is represented by the Signal Extraction and Interference Cancellation (SEIC) module 315 and operates as follows. Specifically, the SEIC module 315 uses each prior coarse estimation 217 of the angles and defines a filtering process on the VAIM matrix 305. Such a filtering in the SEIC module 315 receives the set of prior knowledge 217 (mainly inaccurate estimations) of the azimuth angles of the targets, and the VAIM 305, and allows for extracting the information associated with each prior azimuth angle from the VAIM 305. More importantly, for a specific angle $\phi_1$, the SEIC module 315 will suppress the interference of all other angles $\{\phi_2, \phi_3, \ldots, \phi_p\}$ from the filtered information. The utilized filtering thus allows for recovering the actual angle of the targets with far higher precision since none of the other azimuth angles contribute to the current filter. The utilized filtering thus allows for recovering the actual angle of the targets with far higher precision as none of the other azimuth angles contribute to the current filter.

Thus, for a scene with p targets, the SEIC module 315 results in p independent information vectors $\{.i\}_{i=1}^p$ obtained from the original VAIM and the prior low-accuracy estimations 217 of the angles of the targets, which not only allows for accurately recovering each angle, but also allows for parallel computations to further accelerate the processing time. This is due to the fact that the filters are each focused on a single sector of the scene and can be processed independently to obtain an accurate estimation of the angles.

In the disclosed filtering process, the SEIC module 315 processes the VAIM 305 via taking, in step 317, an M-point 1-D Fourier transform of either rows or columns of the obtained VAIM 305. The filtering process in the SEIC module 315 in step 319 can be implemented using the 1-D fast Fourier transform (FFT) technique in step 317 which is highly efficient and fast. Then, each coarse prior knowledge 217 of the azimuth angles will guide the SEIC module 315 in step 320 to extract the information of the underlying contributing angle as a set of information vectors 322 (i.e., outputting p vectors each of which contains the information of only each of the p targets, without interference from information of the other targets), from the Fourier transformed VAIM 305, in such a manner that: 1) all the information of the interfering angles will be eliminated as part of the filtering; 2) for each azimuth angle, all the correlating signals for it will now be separable (owing to the mixture of the disclosed VAIM 305 and filtering process in the SEIC module 315); and 3) the filtered data can be used to obtain an accurate estimation of the targets for each focused filtered data allowing for parallel and independent computation.

Upon obtaining all the filtered information in terms of p vectors 322, the azimuth angles of all (correlated and non-correlated) targets will be resolved in a highly accurate fashion through a detection process known as High-Resolution Anchor Based Detector (H-RAD) module 325. The H-RAD module 325 thus receives the p information vectors $\{d_i\}_{i=1}^P$ and the prior knowledge of the azimuth angles from the SEIC module 315 and uses each of the prior estimates 217 of angles as anchor points in the scene for the corresponding information vector to output an accurate estimation 225 of the azimuth angles of all targets in the scene.

The underlying process for the H-RAD module 325 is as follows. For each pair of azimuth angles, and the corresponding information vector $\{(\phi_i, d_i)\}_{i=1}^P$, the H-RAD module 325 constructs a so-called power-spectrum P(i) in a power spectrum generator 327, where the peaks of the constructed spectrum for each pair provide an accurate estimation of angles of the underlying target, whose new refined and highly-accurate azimuth angle is given by the location of the peaks of the corresponding peaks in the power-spectrum.

The following discussion provides further features regarding the mathematical basis of the modules discussed above. It is noted that in this disclosure scalar values are defined with lower case letters, vectors are represented in bold-face and lower-case (e.g., v), and matrices are represented with upper-case and bold-face (e.g., M). Furthermore, $R^n$ and $C^n$ define the n-dimensional real-value space, and complex-plane, respectively. Furthermore, $(\bullet)^H$ represents the conjugate transpose of the vector/matrix argument. The azimuth and elevation angles are represented by the symbols $\phi$ and $\theta$, respectively.

First, the discussion will focus on the case that a signal vector y, consisting of p correlated sources are impinging on a uniform linear array (ULA) with s antenna elements as follows:

$$C^s \ni y = As + n.$$

This assumes that the matrix is $A = [a(\phi_1, \theta_1), a(\phi_2, \theta_2), \ldots, a(\phi_p, \theta_p)] \in C^{s \times p}$, where $a(\phi, \theta)$ denotes the steering vector of the array in the direction $(\theta, \phi)$. Hence, the goal of the disclosed approach is to find an accurate estimation of azimuth-elevation angles of all targets. Given the above definitions and assumptions, the following further explanation of the SSPR module 310, the SEIC module 315 and the H-RAD module 325 is provided.

Beginning with the SSPR module 310, the purpose of this stage, in the disclosed approach, is to find an initial estimate of the total number of targets in the scene, and an initial estimate of the target's azimuth or elevation angles, upon which the second stage (e.g., the SEIC module 315 and the H-RAD module 325) is used to refine the estimated angles and number of targets. Specifically, for the sake of this disclosure, the transformation as the N-point discrete 1-D Fourier transform was chosen. The rationale behind such a choice is the following: 1) The 1-D DFT basis vectors resemble the steering vector of the considered array, and thus is an optimum choice for this stage to obtain an initial good estimate of the number of targets and their corresponding angle; and 2) such a choice of basis allows for using a fast Fourier algorithm which is highly efficient in terms of computational complexity (O(n log(n))) and due to its favorable hardware implementation properties, allowing for near real-time computation.

After transforming the received signal y using the FFT operation into its frequency domain representation $\tilde{y}$, the initial angle spectrum of the signal defined by $p = abs(\tilde{y})$ is constructed, i.e., forming a new vector via taking the absolute value of each element of $\tilde{y}$. Next, we proceed with finding all the peaks of the formed spectrum $p = [abs(\tilde{y}_1), \ldots, abs(\tilde{y}_N)]$. Upon finding the peaks of the obtained spectrum, we form the following set containing the index of the peaks in the formed spectrum $S_0 = \{v_1, v_2, \ldots, v_{p^\wedge}\}$.

Two elements of information are encoded into the above set: 1) the cardinality (total number of elements) of the above set $|S_0| = p^\wedge$ represents an initial estimate of the total number of targets in the scene; and 2) the obtained indices $\{v_i\}_{i=1}^{p^\wedge}$ will be used in the SEIC module 315 to guide the angle refinement procedure. We note that the extracted peak indices $v_i$ can be directly translated into an initial estimation of the angles of the targets via the following relationship: $\phi^\wedge i = \cos^{-1}(vi/c)$, where c is a constant depending on N and the inherent properties of the ULA.

To summarize, the input to this stage is the complex-valued signal y received on the ULA, and the output is the set $S_0$ containing an initial estimate of the target locations, or equivalently the index of the corresponding basis vector resulting a peak in the obtained spectrum.

It is noted that one may perform windowing and other pre-processing techniques on the received signal prior to applying the chosen transformation to further increase the quality of the obtained initial set $S_0$. Finally, due to the Vandermonde structure of the steering matrix, the above set obtained using FFT is sufficient for the next SEIC module 315 stage of the disclosed technique, as the basis indices contain sufficient information regarding the phase of the signals encoding the angle information.

As noted above, in the SEIC module 315 and H-RAD module 325 stages, the obtained set $S_0$ from the SSPR module 310 is received and angle refinement is performed to obtain an extremely accurate estimation of the target angles. To this end, let $S_\phi = (\phi_1, \phi_2, \ldots, \phi_p)$ denote the true set of azimuth directions of the targets in the scene (unknown). The main idea behind the stages 315 and 325 is to form a set of vectors $d_i$ for each $i \in S_0$ for which we have: $a^H(\phi_k)d_i = 0$, if the peak frequency index $v_i \in S_0$ contains the angle $\phi_k \in S_\phi$. In other words, the idea is to form $|S_0|$ vectors, such that they are orthogonal to the targets near the initial estimate in elements of $S_\phi$.

Turning to the SEIC module 315, as noted above the goal is to first find the $p^\wedge$ (initial estimation of number of targets) coefficient vector $d_i$ for each of the elements in the initial estimated set $S_0$. To this end, the SEIC module 315 effectively implements the following four steps.

A first step (Step 1) of the SEIC module 315 operation is to calculate the covariance matrix of the received signal $y \in C^s$, using a forward-backward spatial smoothing technique. This step is necessary in the scenes that correlated targets are present. Specifically, a forward-backward spatial smoothing technique is performed, with a user-controlled parameter r, on the received signal y and obtains the following full-rank covariance matrix $R \in C^{r \times r}$. Note that without the above mentioned spatially smoothing technique, one cannot distinguish between the correlated target signals later in the disclosed technique.

For a second step (Step 2) of the SEIC module 315 operation, the same transformation is used as was performed in the SSPR module 315 on the columns (or rows) of the obtained covariance matrix VAIM 305 from the previous step. Specifically, the basis-vectors must be chosen from the same set as the previous stage (i.e., the SSPR module 310 which produces the VAIM 305), however, the number of basis-vectors can be changed according to the application.

Due to the fact that, in the previous stage, an N-point FFT is used to find $S_0$, the FFT transformation is used for this stage as well, however, with N' points. One may wish to choose N'≤N, or N'>N, depending on the desired accuracy.

In light of the above, at this second step, one performs the N' 1-D FFT transformation on the rows of the obtained spatially smoothed covariance matrix R and obtains the transformed matrix $R^- \in C'^{\times N_t}$. This Fourier transformed matrix is thus fed to the next step. It is noted that this step can be implemented very efficiently due to the use of FFT algorithm.

For a third step (Step 3) of the SEIC module 315 operation, some initial transformations are required for forming the coefficient vectors $\{d_i\}^P_{i=1}$ for each potential target in the initial set $S_0$, based on the obtained transformed matrix R, as discussed below.

Following the above steps discussed with regard to the SEIC module 315, the H-RAD module 325 receives the information from the SEIC module 315 obtains coefficient vectors from the previous step can be used to obtain an accurate estimation of the target locations. At this point, one has already calculated p̂ coefficient vector $\{d_i\}^{P^\wedge}_{i=1}$ for each element in the initial set $S_0$. Next, for each $v_i \in S_0$, one first obtains an estimation of the angle corresponding to that index via the above equation for $\phi^\wedge i$. Then, a desirable angle margin m is set, and a set of angles in the interval $[\phi^\wedge i - m, \phi^\wedge i + m]$ is constructed according to any desirable rule (e.g., linearly spaced points, among many other choices). Let the chosen angles be represented by the array $[\phi_{i,1}, \phi_{i,2}, \bullet]$.

Next, the ULA's steering vector $a(\theta)$ is calculated for each corresponding angle in $[\phi_{i,1}, \phi_{i,2}, \ldots]$, and constructs the matrix $A^\wedge = [a(\phi_{i,1}), a(\phi_{i,2}), \ldots]^H$, such that $\phi_{i,n} \leq \phi_{i,m}$ for n≤m. Then, the following spectrum vector is formed: $P_i = 1/abs(Ad_i)$, where abs denotes the absolute value of the vector argument, applied element-wise. Next, the peaks of the obtained spectrum $P_i$ are found. Then, for a peak happening at the p-th element of the vector $P_i$, an output $\phi_{i,1}$ is provided as the accurate estimation of the target's azimuth. The above procedure is repeated for all $\{d_i\}$, and, thus, all the angles in the scene are resolved. An important fact is that there may be more than one target in each index $v_i$ which was initially un-detected. Using the above proposed approach, one is able to detect all the targets in the possible candidate location $v_i$ (and thus the refinement term).

The above description has been provided in terms of using a linear array. However, the disclosed methodology can be extended for planar arrays. Unlike linear arrays that allow for estimating either azimuth or elevation angles (depending on the orientation of the array on the radar platform), a planar array allows for a joint recovery of both azimuth and elevation angles. The disclosed methodology can be easily applied to planar arrays, or a combination of linear and planar arrays on the radar platform to achieve even higher accuracy in estimating the target's angles.

Without loss of generality, one can model the received signal on a 2D array with Ny antenna elements on the y-axis and Nx antenna elements on the x-axis, as a(Nx×Ny) matrix given by: $Y \in C^{N_x \times N_x}$. Without loss of generality, we assume that one is interested in recovering the elevation angles of the targets. However, the following argument can be easily made for the case that the azimuth angles are of interest. Specifically, the procedures described herein are applicable to both cases.

The proposed 2D extension of the proposed technique previously is based on having the knowledge of the azimuth angles of the targets in the scene, i.e., having access to the set of estimated azimuth angles of the targets, given by:

$S^\wedge = \{\phi^\wedge 1, \phi^\wedge 2, \ldots, \phi^\wedge p\}$. It is noted that the above set can be easily obtained using any user-defined DOA estimation technique, for instance, the proposed and described methodology in the previous parts of this disclosure.

The goal of the present disclosure is to exploit the prior knowledge of the set of estimated azimuth angles, to focus the received signal on the URA for each azimuth angle, and then, to extract the elevation angle of each respective target appearing in a fixed azimuth angle using the procedure explained in the previous portions of this disclosure. To this end, the problem from 2D to 1D is first mapped followed by proceeding with the procedures in the previous portions of this disclosure for recovering the elevation angles. Specifically, the received signal Y on the planar array goes through a set of beam-focusing modules prior to applying the described methodology in the previous parts. In the following, the proposed extension for a specific azimuth angle in the set $S^\wedge \phi$, is described, and it is noted that all other angles will go through the same procedure to extract all elevation angles associated with the underlying azimuth angles.

To begin with, it is noted that $\phi \in S^\wedge \phi$ represents an azimuth angle to which it is desired to focus the received signal Y. Then, in order to reduce the problem from 2D into 1D and further focus all the signals into the angle $\phi_i$, a beam-focusing vector $w_i \in C^{N_x}$ associated with the i-th azimuth angle $\phi_i$ is used, and a model is output as: $C^{N_y} \ni y_i = w^H Y$, where w represents the filter that suppress all other angles but $\phi_i$ from the received signal Y. Upon deriving all sets of focused beams $\{y_i\}^P_{i=1}$ associated with $\{\phi_i \in S_\phi\}^P_{i=1}$, $y_i$ is treated as the input to the methodology described in the previous portion of this disclosure, and one then proceeds with extracting all elevation angles for targets having the azimuth angle $\phi_i$. Hence, this resolves all azimuth-elevation angles for all the targets in the scene illuminated by the radar.

In summary, the above description sets forth a novel and sophisticated methodology for direction of arrival estimation of complex scenes, highly suitable for real-time radar imaging systems with applications to autonomous agents, such as autonomous vehicles. It also describes a novel approach for 1-D and 2-D hybrid sequential beamforming technique. The sequential nature of the approach allows for the system to adaptively and reliably resolve the scene in terms of number of targets and the corresponding azimuth and elevation angles of each respective target, via employing low-computational complexity operations. The described SSPR and SEIC modules 310 and 315 allow for separating the correlated signals in a new signal space, while removing the interference of all other azimuth angles. Specifically, the described methodology allows for focusing on a part of the scene illuminated by the radar and cancelling all other interfering signals/targets. This allows the described methodology to accurately and independently resolve the scene via exploiting a prior coarse estimation and knowledge of the targets and their corresponding angles.

Still further, the disclosed SEIC module 315 makes use of simple operations such as DFT for filtering the VAIM matrix 305 in a manner that all the targets are separated while having an outstanding signal interference cancellation property. This allows for an accurate recovery of the angles of all targets that is not possible through using conventional and existing methodologies. This is in contrast to existing methods that use high-computational complexity operations such as singular/eigenvalue decomposition for separating targets. It also describes a novel and first-in-the-literature technique for achieving super-resolution via exploiting the Vandermonde structure of the signal and the corresponding VAIM 305 through the SSPR module 310.

The computational complexity and accuracy of the proposed method can be controlled by the user through a set of hyper parameters, and thus the proposed method is highly flexible. This is unlike all the existing methods whose computational complexity in terms of required computation operations cannot be controlled by the user. The proposed approach is highly flexible and can be easily used for azimuth-only, elevation-only, and sequential beamforming (azimuth then elevation and vice versa), and has high applicability. Finally, as noted above, the disclosed approach is applicable to both linear and planar arrays.

FIG. 4 shows a flow diagram of operations of a system for providing high-resolution beamforming for coherent targets, in accordance with aspects of the present disclosure. To this end, step 410 shows receiving coarse estimations at the processor of at least one of azimuth angles and elevation angles for each of the targets. Step 420 shows applying the correlated input signals to the processor which is configured to apply a semi-randomized signal permutation and reference selection algorithm to the correlated input signals to construct a virtual array information matrix (VAIM) by shifting a reference point of each of the correlated input signals in a different manner from one another to separate the correlated input signals from one another in a signal space in the VAIM. Step 430 shows applying the correlated input signals to the processor, which is configured to apply a semi-randomized signal permutation and reference selection algorithm to the correlated input signals, to construct a virtual array information matrix (VAIM) by shifting a reference point of each of the correlated input signals in a different manner from one another to separate the correlated input signals from one another in a signal space in the VAIM. Next, in step 440, filtering the VAIM is performed by receiving, at the processor, the coarse estimations of the at least one of azimuth angles and elevation angles for each of the targets and independently extracting information of the coarse estimations from the VAIM for each specific azimuth angle or elevation angle of the received correlated input signals to transform the VAIM. This provides a plurality of filtered output signals corresponding, respectively, to filtered versions of each of the coarse estimations of the at least one of azimuth angles and elevation angles for each of the targets. Finally, in step 450, the filtered output signals are used to refine the coarse estimates to provide refined high-resolution output signals.

Figure 5:
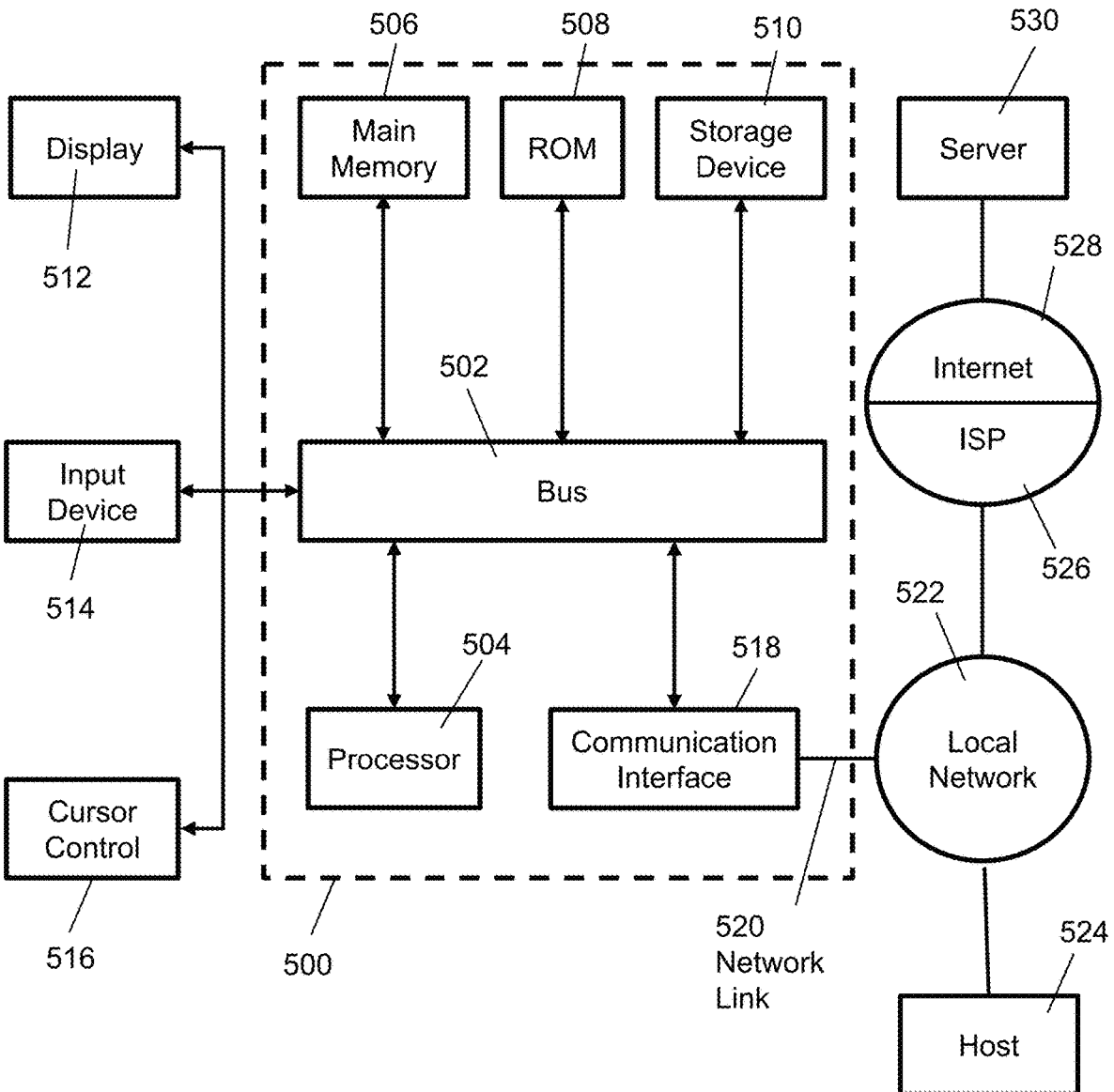
FIG. 5 is a block diagram showing an example computer system upon which aspects of this disclosure may be implemented.

FIG. 5 is a block diagram showing an example of a computer system 500 upon which aspects of this disclosure may be implemented. The computer system 500 may include a bus 502 or other communication mechanism for communicating information, and a processor 504 coupled with the bus 502 for processing information. The computer system 500 may also include a main memory 506, such as a random-access memory (RAM) or other dynamic storage device, coupled to the bus 502 for storing information and instructions to be executed by the processor 504. The main memory 506 may also be used for storing temporary variables or other intermediate information during execution of instructions to be executed by the processor 504. The computer system 500 may implement, for example, an onboard computer 210 in the radar system 102 for running an application to carry out the processing shown in FIGS. 2-4, or, alternatively, a computer in a server in a cloud-based system to receive the radar returns from the radar system 102 to carry out the above-discussed signal processing.

The computer system 500 may further include a read-only memory (ROM) 508 or other static storage device coupled to the bus 502 for storing static information and instructions for the processor 504. A storage device 510, such as a flash or other non-volatile memory may be coupled to the bus 502 for storing information and instructions.

The computer system 500 may be coupled via the bus 502 to a display 512, such as a liquid crystal display (LCD), for displaying information. One or more user input devices, such as the example user input device 514 may be coupled to the bus 502, and may be configured for receiving various user inputs, such as user command selections and communicating these to the processor 504, or to the main memory 506. The user input device 514 may include physical structure, or virtual implementation, or both, providing user input modes or options, and a cursor control 516 for controlling, for example, a cursor, visible to a user through display 512 or through other techniques, and such modes or operations may include, for example virtual mouse, trackball, or cursor direction keys.

The computer system 500 may include respective resources of the processor 504 executing, in an overlapping or interleaved manner, respective program instructions. Instructions may be read into the main memory 506 from another machine-readable medium, such as the storage device 510. In some examples, hard-wired circuitry may be used in place of or in combination with software instructions. The term "machine-readable medium" as used herein refers to any medium that participates in providing data that causes a machine to operate in a specific fashion. Such a medium may take forms, including but not limited to, non-volatile media, volatile media, and transmission media. Non-volatile media may include, for example, optical or magnetic disks, such as storage device 510. Transmission media may include optical paths, or electrical or acoustic signal propagation paths, and may include acoustic or light waves, such as those generated during radio-wave and infra-red data communications, that are capable of carrying instructions detectable by a physical mechanism for input to a machine.

The computer system 500 may also include a communication interface 518 coupled to the bus 502, for two-way data communication coupling to a network link 520 connected to a local network 522. The network link 520 may provide data communication through one or more networks to other data devices. For example, the network link 520 may provide a connection through the local network 522 to a host computer 524 or to data equipment operated by an Internet Service Provider (ISP) 526 to access through the Internet 528 a server 530, for example, to obtain code for an application program.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A method comprising:
   receiving a plurality of correlated input signals and non-correlated input signals at a processor from a plurality of targets in a scene in an environment from antennas in a linear antenna array or a planar antenna array;
   receiving coarse estimations at the processor of at least one of azimuth angles and elevation angles for each of the targets;
   applying the correlated input signals to the processor which is configured to apply a semi-randomized signal permutation and reference selection algorithm to the correlated input signals to construct a virtual array information matrix (VAIM) by shifting a reference point of each of the correlated input signals in a different manner from one another to separate the correlated input signals from one another in a signal space in the VAIM; and
   filtering the VAIM by receiving, at the processor, the coarse estimations of the at least one of azimuth angles and elevation angles for each of the targets and independently extracting information of the coarse estimations from the VAIM for each specific azimuth angle or elevation angle of the received correlated input signals to transform the VAIM to provide a plurality of filtered output signals corresponding, respectively, to filtered versions of each of the coarse estimations of the at least one of azimuth angles and elevation angles for each of the targets.

2. The method of claim 1, further comprising using the filtered output signals to adjust the coarse estimations, respectively, to refine the coarse estimations for at least one of the azimuth angles and elevation angles to provide refined estimation signals of the at least one of the azimuth angles and elevation angles.

3. The method of claim 2, wherein the coarse estimations of the at least one of azimuth angles and elevation angles for each of the targets is obtained by at least one of Fourier transform-based techniques and subspace techniques.

4. The method of claim 3, wherein the correlated input signals are complex-valued input signals received from antenna elements of the linear antenna array or the planar antenna array, and wherein the semi-randomized signal permutation and reference selection algorithm also receives a user-defined hyper-parameter/corresponding to a size of the antenna elements and receives statistical properties of the environment where the targets are located.

5. The method of claim 4, wherein applying the semi-randomized signal permutation and reference selection algorithm to the correlated input signals to construct the virtual array information matrix does not affect any of the received non-correlated input signals.

6. The method of claim 4, wherein filtering the VAIM comprises using a plurality of filters each focused on different single sectors of the scene to independently filter individual portions of the VAIM.

7. The method of claim 6, wherein the filtering is performed as a 1-D Fast Fourier Transform (FFT).

8. The method of claim 6, wherein, for each coarse estimation of the at least one of the azimuth angles and elevation angles, filtering is performed to eliminate all information from all other coarse estimations of the at least one of the azimuth angles and elevation angles.

9. A signal processing system to refine coarse estimates of angles from radar returns of a radar system for high-resolution beamforming, the signal processing system comprising:

one or more processors coupled to receive signals from the radar system; and one or more machine-readable media storing instructions which, when executed by the one or more processors, cause the one or more processors to:

receive a plurality of correlated input signals and non-correlated input signals at a processor from a plurality of targets in a scene in an environment from antennas in a linear antenna array or a planar antenna array of the radar system;

receive coarse estimations at the processor of at least one of azimuth angles and elevation angles for each of the targets;

apply the correlated input signals to a semi-randomized signal permutation and reference selection (SSPR) module in the processor to apply a semi-randomized signal permutation and reference selection algorithm to the correlated input signals to construct a virtual array information matrix (VAIM) by shifting a reference point of each of the correlated input signals in a different manner from one another to separate the correlated input signals from one another in a signal space in the VAIM; and filter the VAIM in a signal extraction and interference cancelation (SEIC) module of the processor, wherein the SEIC module is configured to receive the coarse estimations of the at least one of azimuth angles and elevation angles for each of the targets and independently extract information of the coarse estimations from the VAIM for each specific azimuth angle or elevation angle of the received correlated input signals to transform the VAIM to provide a plurality of filtered output signals corresponding, respectively, to filtered versions of each of the coarse estimations of the at least one of azimuth angles and elevation angles for each of the targets.

10. The signal processing system of claim 9, further comprising instructions, when executed by the one or more processors, cause the one or more processors to use the filtered output signals in a high-resolution anchor based detector (H-RAD) to adjust the coarse estimations, respectively to refine the coarse estimations for at least one of the azimuth angles and elevation angles to provide refined estimation signals of the at least one of the azimuth angles and elevation angles.

11. The signal processing system of claim 10, wherein the coarse estimations of the at least one of azimuth angles and elevation angles for each of the targets is obtained by at least one of Fourier transform-based techniques and subspace techniques.

12. The signal processing system of claim 11, wherein the correlated input signals are complex-valued input signals received from antenna elements of the linear antenna array or the planar antenna array, and wherein the semi-randomized signal permutation and reference selection algorithm also receives a user-defined hyper-parameter/corresponding to a size of the antenna elements and receives statistical properties of the environment where the targets are located.

13. The signal processing system of claim 12, wherein applying the semi-randomized signal permutation and reference selection algorithm to the correlated input signals to construct the virtual array information matrix does not affect any of the received non-correlated input signals.

14. The signal processing system of claim 12, wherein filtering the VAIM comprises using a plurality of filters each focused on different single sectors of the scene to independently filter individual portions of the VAIM.

15. The signal processing system of claim 14, wherein the filtering is performed as a 1-D Fast Fourier Transform (FFT).

16. The signal processing system of claim 14, wherein, for each coarse estimation of the at least one of the azimuth angles and elevation angles, filtering is performed to eliminate all information from all other coarse estimations of the at least one of the azimuth angles and elevation angles.

* * * * *